United States Patent
Rhee et al.

(10) Patent No.: US 7,427,430 B2
(45) Date of Patent: Sep. 23, 2008

(54) POLYAMIDE BLEND COMPOSITION HAVING EXCELLENT GAS BARRIER PERFORMANCE

(75) Inventors: Sangkeun Rhee, Alburtis, PA (US);
Edward P. Socci, Stewartsville, NJ (US); Clark V. Brown, White Plains, NY (US); John V. Facinelli, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 169 days.

(21) Appl. No.: 11/321,575

(22) Filed: Dec. 29, 2005

(65) Prior Publication Data

US 2007/0154668 A1 Jul. 5, 2007

(51) Int. Cl.
*B32B 27/08* (2006.01)
*B29C 45/00* (2006.01)

(52) U.S. Cl. ............... 428/35.7; 264/173.19; 264/216; 264/237; 264/250; 264/255; 264/328.8; 264/331.21; 264/510; 264/512; 264/513; 264/514; 264/515; 428/474.4; 428/474.7; 428/475.2; 428/475.5; 428/475.8; 428/476.1; 428/476.3; 428/910; 524/186; 524/394; 524/398; 524/413; 524/431; 524/435; 524/445; 524/447; 524/449; 524/451; 525/50; 525/66; 525/179; 525/183; 525/432

(58) Field of Classification Search .......... 264/173.19, 264/216, 237, 250, 255, 328.8, 510, 512, 264/513, 514, 515, 331.21; 524/186, 394, 524/398, 399, 413, 431, 435, 445, 447, 449, 524/451; 428/35.7, 474.4, 474.7, 475.2, 428/475.5, 475.8, 476.1, 476.3, 910; 525/50, 525/6, 179, 182, 183

See application file for complete search history.

(56) References Cited

U.S. PATENT DOCUMENTS

| | | | |
|---|---|---|---|
| 4,826,955 A | 5/1989 | Akkapeddi et al. | 528/324 |
| 5,139,878 A | 8/1992 | Kim et al. | 428/421 |
| 5,391,640 A | 2/1995 | Akkapeddi et al. | 525/432 |
| 6,410,156 B1 | 6/2002 | Akkapeddi | |
| 6,423,776 B1 | 7/2002 | Akkapeddi et al. | 525/66 |
| 6,723,443 B2 | 4/2004 | Tsai et al. | 428/475.5 |
| 6,756,444 B2 | 6/2004 | Akkapeddi et al. | 525/66 |
| 2003/0104218 A1 | 6/2003 | Tsai et al. | |
| 2005/0009976 A1 | 1/2005 | Akkapeddi et al. | 524/445 |

FOREIGN PATENT DOCUMENTS

| | | |
|---|---|---|
| EP | 0 411 791 A | 2/1991 |
| WO | WO 01/83318 A | 8/2001 |
| WO | WO 02/072350 A | 9/2002 |
| WO | WO 02/072695 A | 9/2002 |

*Primary Examiner*—Ana L Woodward
(74) *Attorney, Agent, or Firm*—Carrie Beatus

(57) ABSTRACT

High gas barrier, delamination-resistant polyamide compositions suitable for extended shelf-life packaging applications are provided. Also provided are polyamide compositions exhibiting high oxygen scavenging capability. The polyamide compositions comprise mXDA-IPA containing copolymers which provide excellent properties to the complete polyamide compositions. Also provided are direct blends of the polyamide compositions with other polymers. The polyamide products are particularly suited for producing barrier packaging articles such as monolayer or multi-layer films, sheets, thermoformed containers and molded bottles. Such articles are useful in a variety of oxygen-sensitive food, beverage, pharmaceutical, and health care product packaging applications.

53 Claims, No Drawings

US 7,427,430 B2

POLYAMIDE BLEND COMPOSITION HAVING EXCELLENT GAS BARRIER PERFORMANCE

BACKGROUND OF THE INVENTION

1. Field of the Invention

The invention relates to high gas barrier, delamination-resistant polyamide compositions suitable for extended shelf-life packaging applications. The invention also pertains to polyamide compositions exhibiting high oxygen scavenging capability. The polyamide products are particularly suited for producing barrier packaging articles such as monolayer or multi-layer films, sheets, thermoformed containers and molded bottles. Such articles are useful in a variety of oxygen-sensitive food, beverage, pharmaceutical, and health care product packaging applications.

2. Description of the Related Art

It is well known in the art to polyamide based packaging articles such as films, bottles and containers, which are useful for food packaging. In order to enhance freshness preservation, it is well known to package food and beverage products within a packaging structure composed of multiple layers of two or more different plastics. For example, U.S. Pat. Nos. 5,055,355 and 5,547,765 teach laminates of polyamides and ethylene vinyl alcohol copolymers which have good oxygen barrier properties. Such packaging structures generally include a barrier plastic layer which has low permeation to oxygen and/or carbon dioxide.

In order to enhance freshness preservation, it is standard practice to package food and other materials within a laminated packaging material that generally includes a barrier layer having a low permeability to oxygen. The material can be thin, allowing it to be wrapped around the material being packaged, or it can be sufficiently thick to form a shaped container body. It is further known to include an oxygen scavenger in polymeric packaging materials. The oxygen scavenger reacts with oxygen that is trapped in the package or that permeates into the package. This is described, for instance, in U.S. Pat. Nos. 4,536,409 and 6,423,776.

Various types of oxygen scavengers have been proposed for this purpose. U.S. Pat. No. 4,536,409 recommends potassium sulfite as an oxygen scavenger. U.S. Pat. No. 5,211,875 discloses, the use of unsaturated hydrocarbons as oxygen scavengers in packaging films. It is also known in the art that ascorbic acid derivatives as well as sulfites, bisulfites, and phenolics, can be oxidized by molecular oxygen, and can thus serve as an oxygen scavenging material. U.S. Pat. Nos. 5,202,052 and 5,364,555 describe polymeric material carriers containing oxygen scavenging material. These polymeric carriers for the oxygen scavenging material include polyolefin, PVC, polyurethanes, EVA and PET.

There is an ongoing need in the art for a high barrier polymeric material which can provide low permeation of gaseous permeates through the material, as well as high oxygen scavenging capability. The present invention provides new polymeric compositions and structures formed therefrom that show such excellent gas barrier performance as well as high oxygen scavenging capacity, resulting in extended shelf lives of packaged foods or beverages.

More particularly, polymeric compositions of the invention are slow crystallizing blends including a first polyamide comprising a crystallizable polyamide homopolymer, copolymer or polyamide nanocomposite, or a blend thereof, and a second polyamide comprising a m-xylylene diamine moiety, an isophthalic acid moiety and at least one additional moiety comprising a polyamide monomeric precursor. Also provided are direct blends of the above polyamide compositions with other polymeric materials, for example, polyethylene terephthalate (PET), and articles formed therefrom.

Each of the above compositions show good melt processability, good miscibility and slow crystallization to give a barrier layer with a high clarity and good adhesion to other polymer layers in multilayer structures. The compositions also exhibit good recyclability. The composition can also be used for applications of gas barrier films requiring oxygen scavenging capabilities.

SUMMARY OF THE INVENTION

The invention provides a polyamide composition comprising a slow crystallizing blend comprising:
(i) a first polyamide comprising a crystallizable polyamide homopolymer, a crystallizable polyamide copolymer, a crystallizable polyamide nanocomposite, or a blend thereof; and
(ii) a second polyamide comprising a polyamide copolymer comprising a m-xylylene diamine moiety, an isophthalic acid moiety, and at least one additional moiety comprising a polyamide monomeric precursor, and an optional clay.

The invention also provides a polyamide composition comprising a slow crystallizing blend comprising:
(i) a first polyamide comprising a crystallizable polyamide homopolymer, a crystallizable polyamide copolymer, a crystallizable polyamide nanocomposite, or a blend thereof;
(ii) a second polyamide comprising a polyamide copolymer comprising a m-xylylene diamine moiety, an isophthalic acid moiety, and at least one additional moiety comprising a polyamide monomeric precursor, and an optional clay;
(iii) at least one polyamide-compatible, oxidizable polydiene; and
(iv) at least one oxidation promoting metal salt catalyst.

The invention further provides a process for forming a polyamide composition comprising combining:
(i) a first polyamide comprising a crystallizable polyamide homopolymer, a crystallizable polyamide copolymer, a crystallizable polyamide nanocomposite, or a blend thereof; and
(ii) a second polyamide comprising a polyamide copolymer comprising a m-xylylene diamine moiety, an isophthalic acid moiety, and at least one additional moiety comprising a polyamide monomeric precursor, and an optional clay.

The invention still further provides a polymeric composition comprising:
(a) polyamide composition component comprising:
  (i) a first polyamide comprising a crystallizable polyamide homopolymer, a crystallizable polyamide copolymer, a crystallizable polyamide nanocomposite, or a blend thereof; and
  (ii) a second polyamide comprising a polyamide copolymer comprising a m-xylylene diamine moiety, an isophthalic acid moiety, and at least one additional moiety comprising a polyamide monomeric precursor, and an optional clay; and
(b) at least one polymer component blended with said polyamide composition component.

The invention also provides a process for forming a polymeric composition comprising combining at least one polymer component with a polyamide composition component, the polyamide composition component comprising:
(i) a first polyamide comprising a crystallizable polyamide homopolymer, a crystallizable polyamide copolymer, a crystallizable polyamide nanocomposite, or a blend thereof; and
(ii) a second polyamide comprising a polyamide copolymer comprising a m-xylylene diamine moiety, an isophthalic acid moiety, and at least one additional moiety comprising a polyamide monomeric precursor, and an optional clay.

Also provided are films, bottles and other articles and containers formed from the polymeric compositions of the invention.

DETAILED DESCRIPTION OF THE PREFERRED EMBODIMENTS

In the first embodiment of the present invention, an improved polyamide composition is prepared by combining at least two polyamides. The first polyamide is a crystallizable polyamide homopolymer, crystallizable polyamide copolymer, a crystallizable polyamide nanocomposite or a blend thereof. The second polyamide is a polyamide copolymer comprising a m-xylylene diamine moiety, an isophthalic acid moiety, and at least one additional moiety comprising a polyamide monomeric precursor, and an optional clay.

Suitable nylons within the scope of the invention for forming the first polyamide of this embodiment non-exclusively include homopolymers or copolymers selected from aliphatic polyamides and aliphatic/aromatic polyamides having a molecular weight of from about 10,000 to about 100,000. General procedures useful for the preparation of polyamides are well known to the art. Such include the reaction products of diacids with diamines. Useful diacids for making polyamides include dicarboxylic acids which are represented by the general formula:

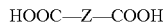

HOOC—Z—COOH wherein Z is representative of a divalent aliphatic radical containing at least 2 carbon atoms, such as adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid and terephthalic acid. Suitable diamines for making polyamides include those having the formula:

$H_2N(CH_2)_nNH_2$ wherein n has an integer value of 1-16, and includes such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulphone, 4,4'-diaminodiphenylmethane, alkylated diamines such as 2,2-dimethylpentamethylenediamine, 2,2,4-trimethylhexamethylenediamine, and 2,4,4 trimethylpentamethylenediamine, as well as cycloaliphatic diamines, such as diaminodicyclohexylmethane, and other compounds. Other useful diamines include heptamethylenediamine, nonamethylenediamine, and the like.

Useful polyamide homopolymers and copolymers include poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), nylon 4,6, poly(hexamethylene adipamide) (nylon 6,6), poly (hexamethylene sebacamide) (nylon 6,10), poly(heptamethylene pimelamide) (nylon 7,7), poly(octamethylene suberamide) (nylon 8,8), poly(hexamethylene azelamide) (nylon 6,9), poly(nonamethylene azelamide) (nylon 9,9), poly(decamethylene azelamide) (nylon 10,9), poly(tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12) and the like. Useful aliphatic polyamide copolymers include caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6) and the like. Also included are other nylons which are not particularly delineated here.

Of these polyamides, preferred polyamides include nylon 6, nylon 6,6, nylon 6/6,6 as well as mixtures of the same. Of these, nylon 6 is most preferred. Polyamides used in the practice of this invention may be obtained from commercial sources or prepared in accordance with known preparatory techniques. For example, poly(caprolactam) can be obtained from Honeywell International Inc., Morristown, N.J. under the trademark CAPRON®.

Exemplary of aliphatic/aromatic polyamides include poly (tetramethylenediamine-co-isophthalic acid) (nylon 4,I), polyhexamethylene isophthalamide (nylon 6,I), hexamethylene adipamide/hexamethylene-isophthalamide (nylon 6,6/6I), hexamethylene adipamide/hexamethyleneterephthalamide (nylon 6,6/6T), poly (2,2,2-trimethyl hexamethylene terephthalamide), poly(m-xylylene adipamide) (MXD6), poly(p-xylylene adipamide), poly(hexamethylene terephthalamide), poly(dodecamethylene terephthalamide), polyamide 6I/6T, polyamide 6T/6I, polyamide 6/MXDT/I, polyamide MXDI, and the like. Blends of two or more aliphatic/aromatic polyamides can also be used. Aliphatic/aromatic polyamides can be prepared by known preparative techniques or can be obtained from commercial sources. Other suitable polyamides are described in U.S. Pat. Nos. 4,826,955 and 5,541,267, which are incorporated herein by reference.

In the preferred embodiments of the invention, the first polyamide preferably comprises polyamides a nylon 6, nylon 66, nylon 6/66, nylon 66/6, nylon MXD6, or nylon 6I,6T or a nanocomposite of nylon 6, nylon 66, nylon 6/66, nylon 66/6, nylon MXD6 or nylon 6I,6T. Of these, more preferred are nylon 6, nylon 66, nylon 6/66 or 66/6 and mixtures of the same, as well as nanocomposites of nylon 6, nylon 6,6, nylon 6/66 or 66/6 and mixtures thereof. Of these, nylon 6 or nylon 6 nanocomposite is most preferred for the first polyamide.

The first polyamide is combined with a second polyamide component which is a polyamide copolymer comprising a m-xylylene diamine moiety, an isophthalic acid moiety, and at least one additional moiety comprising a polyamide monomeric precursor, and an optional clay. More particularly, the second polyamide comprises a semi-crystalline polyamide copolymer having a m-xylylene diamine moiety (mXDA), an isophthalic acid (IPA) moiety and at least one additional moiety comprising a polyamide monomeric precursor. The additional polyamide monomeric precursor moiety of the mXDA-IPA copolymers of the invention may generally comprise a dicarboxylic acid as described above. In the preferred embodiments of the invention, the additional polyamide monomeric precursor moiety comprises an aliphatic dicarboxylic acid such as adipic acid, sebacic acid, octadecanedioic acid, pimelic acid, suberic acid, azelaic acid, dodecanedioic acid and glutaric acid. Most preferably, the additional polyamide monomeric precursor moiety comprises adipic acid.

In the preferred embodiment of the invention, the second polyamide preferably comprises a copolymer comprising from about 20% to about 70% by weight of said m-xylylene diamine moiety, from about 1% to about 30% by weight of said isophthalic acid moiety, and from about 20% to about 60% by weight of said polyamide monomeric precursor moiety. More preferably, the second polyamide comprises a copolymer comprising from about 40% to about 60% by weight of said m-xylylene diamine moiety, from about 5% to about 15% by weight of said isophthalic acid moiety, and from about 30% to about 50% by weight of said polyamide monomeric precursor moiety. Most preferably, the second polyamide comprises a copolymer comprising from about 45 to about 55% by weight of said m-xylylene diamine moiety, from about 7 to about 10% by weight of said isophthalic acid moiety, and from about 35% to about 45% by weight of said polyamide monomeric precursor moiety. Each of the first and second polyamides may be formed using techniques that are well known in the art.

In the overall polyamide composition, the first polyamide is preferably present in an amount of from about 5% to about 50% by weight of the overall polyamide composition, and the second polyamide is preferably present in an amount of from about 50% to about 95% by weight of the overall polyamide composition. More preferably, the first polyamide comprises from about 5 to about 45 percent by weight and the second polyamide comprises from about 55 to about 95 percent by weight of the overall polyamide composition. Most preferably, the first polyamide comprises from about 10 to about 30 percent by weight and the second polyamide comprises from about 70 to about 90 percent by weight of the overall polyamide composition.

In a second embodiment of the invention, the above described polyamide compositions further comprise at least one polyamide-compatible oxygen scavenger. The polyamide-compatible, oxygen scavenger preferably comprises a functional, nylon reactive, oxidizable polydiene or oxidizable polyether. Such are low molecular weight, small particles which are compatible and uniformly dispersible in the polyamide. Preferably the nylon reactive, oxidizable polydiene or polyether comprises an epoxy or anhydride functionality such that it reacts with the carboxyl or amino end groups of the polyamide. The functionality in the polydiene or polyether may also react with amide group in the polyamide backbone. The functionality can be pendant to the backbone or at the chain ends of the polydiene or polyether. The preferred functional polydienes are functional polyalkadiene oligomers which can have the following general backbone structure:

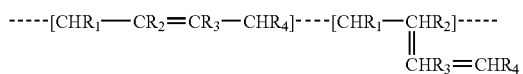

where $R_1$, $R_2$, $R_3$ and $R_4$ can be the same or different and can be selected from hydrogen (—H) or any of the lower alkyl groups (methyl, ethyl, propyl, butyl etc.). $R_2$ and $R_3$ may also be a chloro (—Cl) group. Illustrative of the backbone structure are polybutadiene (1, 4 or 1,2 or mixtures of both), polyisoprene (1, 4 or 3,4), poly 2,3-dimethyl butadiene, polychloroprene, poly 2,3-dichlorobutadiene, polyallene, poly1, 6-hexatriene, etc.

Specific non-limiting examples of polyamide-compatible, functionalized, oxidizable polydienes as suitable oxygen scavengers include epoxy functionalized polybutadiene (1,4 and/or 1,2), maleic anhydride grafted or copolymerized polybutadiene (1,4 and/or 1,2), epoxy functionalized polyisoprene, and maleic anhydride grafted or copolymerized polyisoprene.

A preferred oxygen scavenger includes an anhydride functional polybutadiene oligomer. The molecular weight of the functional polydiene oligomer preferably ranges from about 500 about to 8,000, preferably from about 1000 to about 6000 and most preferably from about 1500 to about 5500. When incorporated, it is preferably present in the overall composition in an amount of from about 0.1% to about 10% by weight, more preferably from about 1% to about 10% and most preferably from about 2% to about 6%. The functional, oxidizable polydiene is preferably present as a large number of small particles whose average particle size is in the range of from about 10 nm to about 1000 nm, and wherein the particles are substantially uniformly distributed throughout the polyamide composition. The polyamide composition may comprise either a blend of the polyamide components and the polyamide-compatible oxidizable polydiene or a reaction product of the polyamide components with the polyamide-compatible oxidizable polydiene.

The polyamide composition of the second embodiment further preferably comprises at least one oxidation promoting metal salt catalyst such as a low molecular weight oxidation promoting metal salt catalyst. Suitable oxidation promoting metal salt catalysts comprise a counterion which is present in acetates, stearates, propionates, hexanoates, octanoates, benzoates, salicylates, and cinnamates and combinations thereof. Preferably the oxidation promoting metal salt catalyst comprises a cobalt, copper or ruthenium, acetate, stearate, propionate, hexanoate, octanoate, benzoate, salicylate or cinnamate, or a combination thereof.

Preferred metal carboxylates include cobalt, ruthenium and copper carboxylate. Of these, the more preferred are cobalt or copper carboxylate and the most preferred is cobalt carboxylate. When incorporated, the metal salt catalyst is preferably present in the overall composition in an amount of from about 0.001% to about 1% by weight, preferably from about 0.002% to about 0.5% and more preferably from about 0.005% to about 0.1%. The most preferred range is from about 0.01% to about 0.05%.

Each of the polyamide compositions of the invention preferably further comprise a nanometer scale dispersed clay, known in the art as a nanoclay. A polyamide combined with a nanoclay is also known in the art as a polyamide nanocomposite. Suitable clays are described in U.S. Pat. No. 5,747, 560, which is incorporated herein by reference. Preferred clays non-exclusively include a natural or synthetic phyllosilicate such as montmorillonite, hectorite, vermiculite, beidilite, saponite, nontronite or synthetic flouromica, which has been cation exchanged with a suitable organoammonium cation. A preferred clay comprises montmorillonite, hectorite or synthetic flouromica, more preferably montmorillonite or hectorite, and most preferably montmorillonite. A preferred organoammonium cation for treating the clay comprises N,N',N",N'"bis(hydroxyethyl), methyl, octadecyl ammonium cation or ω-carboxy alkylammonium cation, i.e., the ammonium cation derived such ω-aminoalkanoic acids as 6-aminocaproic acid, 11-aminoundecanoic acid, 12-aminododecanoic acid. Preferred fine dispersions of nanometer scale silicate platelets may be obtained via an in-situ polymerization of polyamide forming monomer(s) or via melt compounding of polyamide in the presence of the clay. Such methods are described in U.S. Pat. No. 5,747,560. The clay preferably has an average platelet thickness ranging from about 1 nm to about 100 nm, and an average length and average width each ranging from about 50 nm to about 700 nm. It is preferably present in the overall polyamide composition in an amount of from about 0% to about 10% by weight, more preferably from about 0.5% to about 6% and most preferably from about 0.8% to about 4%.

The polyamide compositions of the invention may optionally also include one or more conventional additives whose uses are well known to those skilled in the art. The use of such additives may be desirable in enhancing the processing of the compositions as well as improving the products or articles formed therefrom. Examples of such include oxidative and thermal stabilizers, lubricants, mold release agents, flame-retarding agents, oxidation inhibitors, dyes, pigments and other coloring agents, ultraviolet light stabilizers, organic or inorganic fillers including particulate and fibrous fillers, reinforcing agents, nucleators, plasticizers, as well as other conventional additives known to the art. Such additives may be used in amounts of up to about 10% by weight of the overall polyamide compositions.

Representative ultraviolet light stabilizers include various substituted resorcinols, salicylates, benzotriazole, benzophenones, and the like. Suitable lubricants and mold release agents include stearic acid, stearyl alcohol, and stearamides. Exemplary flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Exemplary plasticizers include lactams such as caprolactam and lauryl lactam, sulfonamides such as o,p-toluenesulfonamide and N-ethyl, N-butyl benzenesulfonamide, and combinations of any of the above, as well as other plasticizers known to the art.

Suitable fillers include inorganic fillers, including those of fibrous and granular nature, as wells as mixtures thereof. The fibrous fillers include glass, silica glass, ceramic, asbestos, alumina, silicon carbide, gypsum, metal (including stainless steel) as well as other inorganic and carbon fibers. The granular fillers include wollastonite, sericite, asbestos, talc, mica, clay, kaolin, bentonite, and silicates, including alumina silicate. Other granular fillers include metal oxides, such as alumina, silica, magnesium oxide, zirconium oxide, titanium oxide. Further granular fillers include carbonates such as calcium carbonate, magnesium carbonate, and dolomite, sulfates including calcium sulfate and barium sulfate, boron nitride, glass beads, silicon carbide, as well as other materials not specifically denoted here. These fillers may be hollow, for example glass microspheres, silane balloon, carbon balloon, and hollow glass fiber. Preferred inorganic fillers include glass fibers, carbon fibers, metal fibers, potassium titanate whisker, glass beads, glass flakes, wollastonite, mica, talc, clay, titanium oxide, aluminum oxide, calcium carbonate and barium sulfate. Particularly, glass fiber is most preferred. The inorganic fillers should preferably be treated with silane, titanate, or another conventional coupling agent, and glass fibers should preferably be treated with an epoxy resin, vinyl acetate resin or other conventional converging agent.

Preferably the polyamide compositions of the invention are produced via melt extrusion compounding of the first and second polyamides, as well as any other composition components, including oxygen scavenger compositions and metal salt catalysts. The composition may be formed by dry blending solid particles or pellets of each of the polyamide components and then melt blending the mixture any other components in a suitable mixing means such as an extruder, a roll mixer or the like. Typical melting temperatures range from about 230° C. to about 300° C., more preferably from about 235° C. to about 280° C. and most preferably from about 240° C. to about 260° C. for the polyamide compositions. Blending is preferably conducted for a period of time suitable to attain a substantially uniform blend. Such may easily be determined by those skilled in the art. If desired, the composition may be cooled and cut into pellets for further processing, may be extruded into a fiber, a filament, or a shaped element, or may be formed into films and optionally uniaxially or biaxially stretched or oriented by means well known in the art.

The polyamide compositions of this invention may be used to produce various single layered or multilayered films, articles, bottles, containers, and the like using conventional processing techniques, including extrusion, lamination, extrusion lamination, coinjection, stretch blow molding, coextrusion blow molding and blown film techniques. The preferred method for making monolayer or multilayer films is by coextrusion. The preferred method for making bottles include extrusion blow molding, coextrusion blow molding, injection blow molding, coinjection blow molding, injection stretch blow molding or coinjection stretch blow molding, and containers are preferably produced via thermoforming techniques. Processing techniques for making blends as well as for making films, sheets, containers and bottles are all well known in the art. For example, the first and second polyamide components (i) and (ii) of the polyamide composition may be pre-blended and then the blend fed into an infeed hopper of an extruder, or each component may be fed into infeed hoppers of an extruder and then blended in the extruder. A melted and plasticated stream from the extruder is fed into a single manifold die and extruded into a layer. It then emerges from the die as a single layer film of material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. Once cooled and hardened, the resulting film is preferably substantially transparent.

When forming a multilayer structure, the material for the individual layers are fed into infeed hoppers of the extruders of like number, each extruder handling the material for one or more of the layers. The melted and plasticated streams from the individual extruders are fed into a single manifold coextrusion die. While in the die, the layers are juxtaposed and combined, then emerge from the die as a single multiple layer film of polymeric material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die.

In another method, a film forming apparatus may be one which is referred to in the art as a blown film apparatus and includes a multi-manifold circular die head for bubble blown film through which the plasticized film composition is forced and formed into a film bubble which may ultimately be collapsed and formed into a film. Processes of coextrusion to form film and sheet laminates are generally known. See for example in "Modern Plastics Encyclopedia", Vol. 56, No. 10A, pp. 131-132, McGraw Hill, October 1979. Alternatively, individual layers may first be formed into sheets and then laminated together under heat and pressure with or without intermediate adhesive layers.

As mentioned above, the composition may also be used to form a shaped article through any well known process, including extrusion blow molding and injection stretch-blow molding. An injection molding process softens the thermoplastic blend in a heated cylinder, injecting it while molten under high pressure into a closed mold, cooling the mold to induce solidification, and ejecting the molded pre-form from the mold. Molding compositions are well suited for the production of pre-forms and subsequent reheat stretch-blow molding of these pre-forms into the final bottle shapes having the desired properties. The injection molded pre-form is heated to suitable orientation temperature, often in about the 80° C. to 150° C. range, and then stretch-blow molded. The latter process consists of first stretching the hot pre-form in the axial direction by mechanical means such as by pushing with a core rod insert followed by blowing high pressure air (up to about 500 psi) to stretch it in the hoop direction. In this manner, a biaxially oriented blown bottle is made. Typical blow-up ratios often range from about 5:1 to about 15:1.

The polyamide compositions of this invention may be formed as an integral layer in a multilayered film, bottle or container which includes one or more layers of another thermoplastic polymer such as polyesters, particularly polyethylene terephthalate (PET) and PET copolymers, polyolefins, ethylene vinyl alcohol copolymers, acrylonitrile copolymers, acrylic polymers, vinyl polymers, polycarbonates, polystyrenes, polyamides, fluoropolymers, and the like. The polyamide compositions of this invention are particularly suitable as barrier layers in the construction and fabrication of multilayer bottles and thermoformed containers in which PET or polyolefin layers function as structural layers. Such PET/polyamide multilayer bottles can be made by coinjection stretch blow molding processes similar to the injection stretch blow molding process as described above. Similarly, such multilayer bottles can be made by coextrusion blow molding. The latter process usually employs suitable optional adhesive tie layers for adhesion.

Useful polyesters for coinjection stretch blow molding process include polyethylene terephthalate and its copolymers in the intrinsic viscosity (I.V.) range of about 0.5 to about 1.2 dl/g, more preferably in the I.V. range of from about 0.6 to about 1.0 dl/g and most preferably in the I.V. range of from about 0.7 to about 0.9 dl/g. The polyolefins used in coextrusion blow molding preferably comprise polymers of alpha-olefin monomers having from about 2 to about 6 carbon atoms, and includes homopolymers, copolymers (including graft copolymers), and terpolymers of alpha-olefins and the like. Examples of such nonexclusively include ultra low density polyethylene (ULDPE); low density polyethylene (LDPE); linear low density polyethylene (LLDPE); metallocene linear low density polyethylene (m-LLDPE); medium density polyethylene (MDPE); high density polyethylene (HDPE); polypropylene; polybutylene; polybutene-1; poly-3-methylbutene-1; poly-pentene-1; poly-4-methylpentene-1; polyisobutylene; polyhexene and the like. Such polyolefins may have a weight average molecular weight of from about 1,000 to about 1,000,000, and preferably of from about 10,000 to about 500,000. Preferred polyolefins include polyethylene, polypropylene, polybutylene and copolymers and blends thereof. The most preferred polyolefins include polyethylene and polypropylene.

Preferred fluoropolymers include, but are not limited to, homopolymers and copolymers of chlorotrifluoroethylene, ethylene-chlorotrifluoroethylene copolymer, ethylene-tetrafluoroethylene copolymer, fluorinated ethylene-propylene copolymer, perfluoroalkoxyethylene, polychlorotrifluoroethylene, polytetrafluoroethylene, polyvinyl fluoride, polyvinylidene fluoride, and copolymers and blends thereof. As used herein, copolymers include polymers having two or more monomer components. The most preferred fluoropolymers include homopolymers and copolymers of poly(chlorotrifluoroethylene) (PCTFE). Particularly preferred are PCTFE materials sold under the ACLON™ trademark and which are commercially available from Honeywell International Inc. of Morristown, N.J.

Suitable copolymers of ethylene and vinyl alcohol suitable for use in the present invention can be prepared by the methods disclosed in U.S. Pat. Nos. 3,510,464; 3,560,461; 3,847,845; and 3,585,177. Suitable acrylonitrile copolymers, acrylic polymers, vinyl polymers, polycarbonates, polystyrenes and fluoropolymers for use in the present invention can be prepared by methods which are well known in the art. Suitable polyamides can be prepared using methods previously described herein. Additional layers may also include adhesive tie layers to tie various layers together. Non-limiting examples of other optional polymeric layers and adhesive tie layers which can be used in films of the present invention are disclosed, for example, in U.S. Pat. Nos. 5,055,355; 3,510, 464; 3,560,461; 3,847,845; 5,032,656; 3,585,177; 3,595,740; 4,284,674; 4,058,647; and 4,254,169.

In a third embodiment of the invention, the polyamide compositions of the invention may comprise direct blends of the first and second polyamides with an additional polymer component. This additional polymer component may comprise any of the aforementioned polymers, particularly including polyethylene terephthalate and PET copolymers, polyolefins, ethylene vinyl alcohol copolymers, acrylonitrile copolymers, acrylic polymers, vinyl polymers, polycarbonate, polystyrene and the like. In this embodiment, the additional polymer component preferably comprises at least about 50% by weight of the overall direct blend composition, more preferably at least about 80% and most preferably at least about 90% by weight of the overall direct blend composition. As with each of the other compositions described herein, these direct blend compositions may be formed into single or multilayer films, as well as other articles such as bottles and containers. However, these direct blends are particularly intended to be formed into single layer structures. The direct blends may also further comprise at least one polyamide-compatible oxygen scavenger and optionally at least one oxidation promoting metal salt catalyst, as described above.

The single or multilayer films of the invention include at least one polyamide composition layer, which polyamide composition layer has first and second surfaces. In a preferred multilayer film construction, a two layer film is formed which comprises at least one thermoplastic polymer layer attached to at least one of said first and second surfaces of said polyamide composition layer. In another preferred multilayer film construction, a three layer film is formed which comprises at least one thermoplastic polymer layer attached to each of said first and second surfaces of the polyamide composition layer. For example, a three layer film may comprise a PET/polyamide composition layer/PET structure. Other preferred film structures non-exclusively include PE/tie/EVOH/polyamide composition/EVOH/tie/PE; PE/tie/EVOH/polyamide composition/tie/PE; and PE/tie/polyamide composition/tie/PE, where the PE layer may comprise LDPE, HDPE, LLDPE or any other polyethylene layer as described above. Adhesive materials may also be blended into either the PE or EVOH layers, rather than used a discrete layer.

Optionally, adhesive layers, also known as "tie" layers, may be formed or placed between each film layer. Suitable adhesive layers include adhesive polymers such as modified polyolefin compositions having at least one functional moiety selected from the group consisting of unsaturated polycarboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid and anhydride and the like. Of these, the most preferred is maleic anhydride. The modified polyolefins suitable for use in this invention include compositions described in U.S. Pat. Nos. 3,481,910; 3,480,580; 4,612,155 and 4,751,270 which are incorporated herein by reference. Other adhesive layers non-exclusively include alkyl ester copolymers of olefins and alkyl esters of $\alpha,\beta$-ethylenically unsaturated carboxylic acids such as those described in U.S. Pat. No. 5,139,878. The preferred modified polyolefins comprise from about 0.001 and about 10 weight percent of the functional moiety, based on the total weight of the modified polyolefin. More preferably the functional moiety comprises from about 0.005 and about 5 weight percent, and most preferably from about 0.01 and about 2 weight percent. The modified polyolefin composition may also contain up to about 40 weight percent of thermoplastic elastomers and alkyl esters as described in U.S. Pat. No. 5,139,878. Alternatively, one or more adhesive polymers may be directly blended or coextruded into other layers of the film, thus providing adhesion while minimizing the number of layers in the film.

Films produced according to the present invention may be oriented by stretching or drawing the films at draw ratios of from about 1.1:1 to about 10:1, and preferably at a draw ratio of from about 2:1 to about 5:1. The term "draw ratio" as used herein indicates the increase of dimension in the direction of the draw. Therefore, a film having a draw ratio of 2:1 has its length doubled during the drawing process. Generally, the film is drawn by passing it over a series of preheating and heating rolls. The heated film moves through a set of nip rolls downstream at a faster rate than the film entering the nip rolls at an upstream location. The change of rate is compensated for by stretching in the film.

The films may be stretched or oriented in any desired direction using methods well known to those skilled in the art. The film may be stretched uniaxially in either the longitudinal direction coincident with the direction of movement of the film being withdrawn from the film forming apparatus, also referred to in the art as the "machine direction", or in as direction which is perpendicular to the machine direction, and referred to in the art as the "transverse direction", or biaxially in both the longitudinal direction and the transverse direction. The films may be further annealed or heat treated to further enhance their barrier properties. Heated fluids or IR radiation heaters can be utilized in the annealing or heat treatment processes. Such techniques are well known in the art.

Films of the invention preferably have a thickness of from about 5 μm to about 400 μm, more preferably from about 10 μm to about 200 μm, and most preferably from about 15 μm to about 100 μm. While such thicknesses are preferred as providing a readily flexible film, it is to be understood that other film thicknesses may be produced to satisfy a particular need and yet fall within the scope of the present invention. Such thicknesses which are contemplated include plates, thick films, and sheets which are not readily flexible at room temperature (approx. 20° C.).

One noteworthy characteristic of films and articles produced from the composition of this invention is that they exhibit excellent gas barrier properties, particularly oxygen and $CO_2$ barrier properties. Oxygen permeation resistance or barrier may be measured using the procedures of ASTM D-3985. In general, the films of this invention have an oxygen transmission rate (OTR) of about less than 1 cc.mil/100 in²/day at 80% relative humidity (RH) in air at atmospheric pressure. For scavenging compositions, the OTR (in cc.mil/100 in 2/day) preferably ranges from about 0.001 to about 2, more preferably from about 0.001 to about 0.5 and most preferably from about 0.001 to about 0.1 cc.mil/100 in²/day at 80% RH in air at atmospheric pressure. The OTR for non-oxygen scavenging compositions measured at 65% RH, 23° C. in pure oxygen is preferably less than about 1.5 cc mil/100 in²/day, more preferably more preferably less than about 1.2 cc mil/100 in²/day, and most preferably less than about 1.0 cc mil/100 in²/day) at atmospheric pressure. In general, the films of this invention preferably have a carbon dioxide transmission rate measured in accordance with ASTM F2476 (conducted at 80% RH, 23° C.) of less than about 2 cc mil/100 in²/day, more preferably less than about 1.6 cc mil/100 in²/day, less than about 1.0 cc mil/100 in²/day at atmospheric pressure.

The glass transition temperature (Tg) of the polyamide compositions of this invention, as determined by differential scanning calorimetry techniques, are preferably much less than about 120° C., which is generally the upper temperature limit for neat PET's reheat stretch blow moldability into distortion-free bottles. In addition, in coinjection stretch blow molding processes for making mono or multilayer bottles, extensive voiding with potential barrier loss might occur if the Tg of the polyamide composition exceeds about 110° C. The polyamide composition therefore preferably has a Tg of from about 20° C. to about 110° C., more preferably from about 40° C. to about 100° C. and most preferably from about 60° C. to about 90° C.

The polyamide compositions of this invention preferably exhibit a slow crystallization behavior similar to that of PET, characterized by no or slow onset of crystallization, as determined by the differential scanning calorimetry (DSC) crystallization exotherm (Tcc) peak that occurs upon cooling the melt from 280° C. at a programmed cooling rate of 20° C./min. For PET, Tcc is about 190° C., which is about 70° C. below its crystalline melting point ($T_m$) of 260° C. Thus, the polyamide composition of this invention preferably exhibits a low Tcc or crystallization temperature of about 160° C. or less, upon cooling from the melt at a cooling rate of 10° C./min in a DSC apparatus. At faster cooling rates (80° C./min) the polyamides of this invention exhibit lower Tcc.

The following non-limiting examples serve to illustrate the invention. It will be appreciated that variations in proportions and alternatives in elements of the components of the invention will be apparent to those skilled in the art and are within the scope of the present invention.

EXAMPLES

The following process and characterizations steps were conducted for the following examples and comparative example.

Process Step 1: Preparation of Catalyst Masterbatch (MB)

This masterbatch is used as an additive in process step two or three for the preparation of an oxygen scavenging resin. A Leistritz 18 mm co-rotating twin screw extruder equipped with a K-tron volumetric feeder was utilized in preparing the catalyst masterbatch. The screw used in this process was designed with three mixing zones and a venting zone. A blend of nylon 6 (Honeywell B73ZP) pellets and cobalt stearate pastilles (from Shepherd Chemical Co.) was fed into the throat of the extruder at a rate of ten (10) pounds per hour. The blend ratio was 95 weight percent PA-6 (Honeywell B73ZP) and five (5) weight percent cobalt stearate (Shepherd Chemical). After mixing in the extruder, the extrudate passed through a die plate and was quenched in a water bath and finally pelletized.

Process Step 2: Preparation of Resin Products by Melt Extrusion.

A Leistritz 18-mm co-rotating twin screw extruder equipped with a K-Tron volumetric feeder was employed. Blends of MXD6/MXDI copolyamide (EMS XS-0501) with either a) nylon 6 polyamide (Honeywell H73ZP), b) nylon 6 nanoclay polymer (Honeywell 4% nanoclay PA6, XA2979) or a nylon 6 15.7% nanoclay masterbatch (Nanocor® nanopolyamide concentrate (NPC)) were fed into the nitrogen-blanketed throat of the extruder at a rate of 10 pounds per hour. The extruder was equipped with two mixing zones consisting primarily of kneading elements. The extruder was equipped with a vacuum zone subsequent to the second mixing zone and prior to the die plate. The extrudate was quenched in a water bath and then pelletized.

Process Step 3: Preparation of Oxygen Scavenging Composition

A Leistritz 18-mm co-rotating twin screw extruder equipped with a K-Tron volumetric feeder is employed. A polybutadiene (maleic anhydride functionalized polybutadiene—Ricon 131 MA5) is stored in a sealed drum vessel and metered with a Nichols-Zenith pump directly in the extruder barrel following the feed throat. The polybutadiene is injected directly into the extruder prior to the first (of two) mixing zones via a Leistritz direct liquid injection nozzle. A blend of an MXD6/MXDI copolyamide (EMS XS-0501), at least one of nylon 6, 4% nylon 6 nanocomposite or 15.7% nylon nanocomposite, and the cobalt stearate masterbatch of Process step 1 are fed into the nitrogen-blanketed throat of the extruder at a rate of 10 pounds per hour. The blend consists of approximately 98 weight polyamides and 2 weight percent cobalt masterbatch. The polybutadiene is pumped at a rate such that weight percentages of 1% to 5% polybutadiene are added. The extruder is equipped with two mixing zones consisting primarily of kneading elements. The extruder is equipped with a vacuum zone subsequent to the second mixing zone and prior to the die plate. The extrudate is then quenched in a water bath and pelletized.

Process Step 4: Preparation of Pellet Blended Products.

Compositions can be prepared by a pellet blending approach rather than melt compounding. Blending was accomplished by weighing out the required amount of each polyamide material into a large container. The container was tumbled for approximately 5 minutes to ensure thorough mixing of the two components. These blends were used subsequently as feedstock for film or container processing.

Process Step 5: Monolayer Film Preparation

A 19 mm Haake single screw extruder equipped with a six-inch (152.4 mm) wide film die was flood fed with pellets, such as those from process 2, 3 or 4. Extruder temperature was set at approximately 260° C. The extrudate passed through the slit die onto a heated Killion cast roll. Film thickness was adjusted via cast roll speed and/or screw RPM to prepare a film with thickness of about 0.001 inch to about 0.004 inch (0.0254 to 0.1016 mm).

Process 6: Multilayer Film Preparation

Three Killion single screw extruders equipped with a twelve-inch wide film coextrusion die are utilized to prepare a three, five or seven layer multilayer film. One extruder is flood fed with pellets from process 2, 3 or 4 and made into an inner layer. The second extruder is flood fed with one or more of, for example, polyethylene, polypropylene, polyethylene terephthalate, polycarbonate, ethylene vinyl alcohol or nylon, and extruded into two outer layers. The third extruder is flood fed with an adhesive tie resin which can effectively bind together the incompatible polymers such as a center polyamide layer from the first extruder and skin layers from the second extruder. Extruder temperatures are about 150° C.-300° C. in all three extruders, depending on the polymer film composition. Extrudates are passed through the slit die onto a heated cast roll. Film thickness is adjusted via cast roll speed and/or screw RPM to prepare a film.

Process 7: Multilayer Bottles (Co-Injection Stretch Blow Molding)

A three layer co-injection stretch blow molding process was used to prepare multilayer beverage bottles with the following structure: PET/polyamide blend/PET. The total polyamide blend content was 5 weight percent of the total pre-form weight. Pre-forms were prepared with an Arburg coinjection press equipped with a coinjection head/manifold and multilayer perform mold. PET extruder temperature settings were approximately 280° C. Extruder temperature settings for the polyamide blend compositions were approximately 260° C. Finished bottles were prepared on Sidel stretch blow molding equipment, with a pre-form preheat temperature of approximately 90-110° C. In each case, standard processing techniques were utilized.

Oxygen Transmission Measurements

Oxygen transmission rate (OTR) measurements were conducted on film samples on a Mocon Oxtran 2/20 apparatus equipped with SL sensors. Tests were conducted at 65% relative humidity (RH) using 100% oxygen and a 23° C. testing temperature. Data was collected and recorded in units of cc mil/100 in$^2$/day.

Carbon Dioxide Transmission Measurements

Carbon dioxide transmission rate ($CO_2$TR) measurements were conducted on film samples on a Mocon Permatran C440 apparatus at 80% RH($CO_2$ side set at 80% RH, nitrogen carrier gas side was dry), 23° C. Data was collected and reported in units of cc mil/100 in$^2$/day.

Carbon dioxide transmission measurements were conducted on bottle samples as well. Bottles were carbonated with dry ice to obtain 4.0 volumes of $CO_2$ gas. The amount of $CO_2$ gas contained in each bottle was determined by measuring the $CO_2$ absorption peak using Fourier Transform Infra Red (FTIR) analysis. This information was used to estimate the amount of time required for the bottles to reach 17.5% carbonation loss.

In addition to the FTIR testing, bottles were carbonated with water and placed onto the Mocon Permatran unit to determine the carbon dioxide permeation rate in cc/pkg/day. The bottles were carbonated to 4.0 volumes $CO_2$ and held within a chamber on the permeation test device. The chamber was continuously swept with dry purge gas and evaluated for $CO_2$ content.

Example 1 (Comparative)

Comparative Example 1 illustrates a polyamide 6 composition that does not include the MXDA-IPA copolymers of the invention. A polyamide composition was formed which formulation comprised 100 weight percent nylon 6. This formulation was prepared via process step five, and later cast into film via conventional techniques. The OTR of this nylon was 3 cc mil/100 in$^2$/day. The $CO_2$TR of this nylon was measured at 14 cc mil/100 in$^2$/day.

Example 2

A blend of 70 weight % MXD6/MXDI copolyamide (i.e. adipic acid-MXDA-isophthalic acid copolyamides) and 30 weight % nylon 6 was formed and processed via process steps 2, 4, 5 and 7. A 16 oz, 24 gram, 28 mm bottle was formed having a straight wall and petalloid base. The bottle was tested for OTR and $CO_2$TR. The OTR was measured at 0.9 cc mil/100 in$^2$/day. The $CO_2$TR was measured at 1.5 cc mil/100 in$^2$/day. The OTR and $CO_2$TR were significantly better than the nylon 6 homopolymer of Comparative Example 1. $CO_2$ permeation testing on a Mocon Permatran unit as described above revealed a $CO_2$ permeation rate of 0.21 cc/pkg/day. The bottle has a predicted shelf life of 16 weeks.

Example 3

A blend of 80 weight % MXD6/MXDI copolyamide and 20 weight % nylon 6 was formed and processed via process steps 2 and 5. A film of the composition was tested for OTR and $CO_2$TR. The OTR was measured at 0.7 cc mil/100 in$^2$/day. The $CO_2$TR was measured at 1.1 cc mil/100 in$^2$/day. The OTR and $CO_2$TR were significantly better than the nylon 6 homopolymer of Comparative Example 1.

Example 4

A blend of 90 weight % MXD6/MXDI copolyamide and 10 weight % nylon 6 was formed and processed via process steps 2 and 5. A film of the composition was tested for OTR and $CO_2TR$. The OTR was measured at 0.4 cc mil/100 in$^2$/day. The $CO_2TR$ was measured at 0.6 cc mil/100 in$^2$/day. The OTR and $CO_2TR$ were significantly better than the nylon 6 homopolymer of Comparative Example 1.

Example 5

A blend of 70 weight % MXD6/MXDI copolyamide and 30 weight % of a nylon 6 nanocomposite containing 4% nanoclay (Honeywell 4% nanoclay PA6, XA2979) was formed and processed via process steps 2 and 5. A film of the composition was tested for OTR and $CO_2TR$. The OTR was measured at 0.6 cc mil/100 in$^2$/day. The $CO_2TR$ was measured at 1.2 cc mil/100 in$^2$/day. The OTR and $CO_2TR$ were significantly better than the nylon 6 homopolymer of Comparative Example 1.

Example 6

A blend of 70 weight % MXD6/MXDI copolyamide, 15 weight % of a nylon 6 nanocomposite containing 4% nanoclay (Honeywell 4% nanoclay PA6, XA2979) and 15 weight % of a nylon 6 nanocomposite containing 15.7% nanoclay (Nanocor® nano-polyamide concentrate (NPC)) was formed and processed via process steps 2 and 5. A film of the composition was tested for OTR and $CO_2TR$. The OTR was measured at 0.5 cc mil/100 in$^2$/day. The $CO_2TR$ was measured at 1.2 cc mil/100 in$^2$/day. The OTR and $CO_2TR$ were significantly better than the nylon 6 homopolymer of Comparative Example 1.

The above data is summarized in Table 1 below.

Example 13

A three-layer PET/polyamide blend/PET structure is formed following the techniques of process 6.

Example 14

A seven-layer PE/tie/EVOH/polyamide composition/EVOH/tie/PE structure is formed following the techniques of process 6.

Example 15

A seven-layer PE/tie/EVOH/polyamide blend/EVOH/tie/PE structure is formed following the techniques of process 6.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A polyamide composition comprising a slow crystallizing blend comprising:

(i) a first polyamide comprising a crystallizable polyamide homopolymer, a crystallizable polyamide copolymer, a crystallizable polyamide nanocomposite, or a blend thereof; and
   (ii) a semi-crystalline second polyamide comprising a polyamide copolymer comprising from about 40% to about 60% by weight of an m-xylylene diamine moiety, from about 5% to about 15% by weight of an isophthalic acid moiety, and from about 30% to about 50% by weight of an aliphatic dicarboxylic acid precursor, and an optional clay.

TABLE 1

| Example Number | Process Steps | Wt. % PA6 | Wt. % PA6 4% Nano | Wt. % PA6 15.7% Nano | Wt. % MXD6/MXDI Copolyamide | Wt. % Catalyst MB | Wt. % PBD | OTR | $CO_2$ TR |
|---|---|---|---|---|---|---|---|---|---|
| 1 | 5 | 100 | | | | | | 3 | 14 |
| 2 | 2, 4, 5, 7 | 30 | 0 | 0 | 70 | | | 0.9 | 1.5 |
| 3 | 2, 5 | 20 | 0 | 0 | 80 | | | 0.7 | 1.1 |
| 4 | 2, 5 | 10 | 0 | 0 | 90 | | | 0.4 | 0.6 |
| 5 | 2, 5 | 0 | 30 | 0 | 70 | | | 0.6 | 1.2 |
| 6 | 2, 5 | 15 | 0 | 15 | 70 | | | 0.5 | 1.2 |

Examples 7-12

Additional polymer blends are formed via process steps 2, 3, 5 and 7 providing desirable results. Such additional blends are formed as in the following Table 2 below:

TABLE 2

| Example Number | Process Steps | Wt. % PA6 | Wt. % PA6 4% Nanoclay | Wt. % PA6 15.7% Nanoclay | Wt. % MXD6/MXDI Copolyamide | Wt. % Catalyst MB | Wt. % PBD |
|---|---|---|---|---|---|---|---|
| 7 | 2, 3, 5, 7 | 25 | | | 70 | 2 | 3 |
| 8 | 2, 3, 5, 7 | 15 | | | 80 | 2 | 3 |
| 9 | 2, 3, 5, 7 | 5 | | | 90 | 2 | 2 |
| 10 | 2, 3, 5, 7 | | 25 | | 70 | 2 | 3 |
| 11 | 2, 3, 5, 7 | | 15 | | 80 | 2 | 3 |
| 12 | 2, 3, 5, 7 | 10 | | 15 | 70 | 2 | 3 |

2. The composition of claim 1 wherein said second polyamide further comprises a clay.

3. The composition of claim 1 wherein a clay is absent from said second polyamide.

4. The composition of claim 1 wherein said aliphatic dicarboxylic acid precursor moiety comprises adipic acid.

5. The composition of claim 1 wherein said polyamide composition comprises from about 5% to about 50% of (i) and from about 50% to about 95% of (ii) by weight of the polyamide composition.

6. The composition of claim 1 wherein said polyamide composition comprises from about 20 to about 45 percent of (i) and from about 55 to about 80 percent of (ii) by weight of the polyamide composition.

7. The composition of claim 1 wherein said first polyamide comprises a polyamide nanocomposite.

8. The composition of claim 1 wherein said first polyamide comprises nylon 6, nylon 66, nylon 6/66, nylon 66/6, nylon MXD6, or nylon 6I,6T or a nanocomposite of nylon 6, nylon 66, nylon 6/66, nylon 66/6, nylon MXD6 or nylon 6I,6T.

9. A film comprising the polyamide composition of claim 1, wherein said film comprises at least one polyamide composition layer.

10. The film of claim 9 wherein said film is either mono-axially oriented or biaxially oriented.

11. The film of claim 9 wherein said polyamide composition layer has first and second surfaces, and wherein said film further comprises at least one thermoplastic polymer layer attached to at least one of said first and second surfaces of said polyamide composition layer.

12. The film of claim 11 wherein said thermoplastic polymer layer comprises a polyolefin, a polyester, ethylene vinyl alcohol or a polyamide.

13. The film of claim 11 wherein said thermoplastic polymer layer comprises polyethylene terephthalate.

14. The film of claim 11 wherein said thermoplastic polymer layer comprises ethylene vinyl alcohol.

15. The film of claim 9 wherein said polyamide composition layer has first and second surfaces, and wherein said film further comprises at least one thermoplastic polymer layer attached to each of said first and second surfaces of said polyamide composition layer.

16. The polyamide composition of claim 1 wherein said slow crystallizing blend further comprises:
(iii) at least one polyamide-compatible, oxidizable polydiene; and
(iv) at least one oxidation promoting metal salt catalyst.

17. The composition of claim 16 wherein said polyamide-compatible, oxidizable polydiene comprises a polybutadiene.

18. The composition of claim 16 wherein said polyamide-compatible, oxidizable polydiene comprises an epoxy or anhydride functional polybutadiene.

19. The composition of claim 16 wherein said polyamide-compatible, oxidizable polydiene is in the form of particles which are substantially uniformly distributed in the polyamide blend.

20. The composition of claim 16 further wherein said oxidation promoting metal salt catalyst comprises a carboxylate.

21. The composition of claim 16 wherein said oxidation promoting metal salt catalyst comprises a metal acetate, stearate, propionate, hexanoate, octanoate, benzoate, salicylate, cinnamate, or a combination thereof.

22. The composition of claim 16 wherein said oxidation promoting metal salt catalyst comprises a cobalt, copper or ruthenium, acetate, stearate, propionate, hexanoate, octanoate, benzoate, salicylate, cinnamate, or a combination thereof.

23. The composition of claim 16 wherein said aliphatic dicarboxylic acid precursor moiety comprises adipic acid.

24. The composition of claim 16 wherein said second polyamide further comprises a clay.

25. A film comprising the polyamide composition of claim 16, wherein said film comprises at least one polyamide composition layer.

26. The film of claim 25 wherein said film is either mono-axially oriented or biaxially oriented.

27. The film of claim 25 wherein said polyamide composition layer has first and second surfaces, and wherein said film further comprises at least one thermoplastic polymer layer attached to at least one of said first and second surfaces of said polyamide composition layer.

28. The film of claim 27 wherein said thermoplastic polymer layer comprises a polyolefin, a polyester, ethylene vinyl alcohol or a polyamide.

29. The film of claim 27 wherein said thermoplastic polymer layer comprises polyethylene terephthalate.

30. The film of claim 27 wherein said thermoplastic polymer layer comprises ethylene vinyl alcohol.

31. The film of claim 25 wherein said polyamide composition layer has first and second surfaces, and wherein said film further comprises at least one thermoplastic polymer layer attached to each of said first and second surfaces of said polyamide composition layer.

32. An article comprising the composition of claim 16.

33. The article of claim 32 which is a bottle.

34. An article comprising the composition of claim 1.

35. The article of claim 34 which is a bottle.

36. A process for forming a polyamide composition comprising combining:
(i) a first polyamide comprising a crystallizable polyamide homopolymer, a crystallizable polyamide copolymer, a crystallizable polyamide nanocomposite, or a blend thereof; and
(ii) a semi-crystalline second polyamide comprising a polyamide copolymer comprising from about 40% to about 60% by weight of an m-xylylene diamine moiety, from about 5% to about 15% by weight of an isophthalic acid moiety, and from about 30% to about 50% by weight of an aliphatic dicarboxylic add precursor, and an optional clay.

37. The process of claim 36 further comprising forming said polyamide composition into an article.

38. The process of claim 37 which article comprises a film.

39. The process of claim 37 which article comprises a bottle.

40. The process of claim 36 wherein said aliphatic dicarboxylic acid precursor moiety comprises adipic acid.

41. The process of claim 36 further comprising combining at least one polyamide-compatible, oxidizable polydiene; and at least one oxidation promoting metal salt catalyst with (i) and (ii).

42. The process of claim 36 wherein said second polyamide further comprises a clay.

43. A polymeric composition comprising:
(a) polyamide composition component comprising:
(i) a first polyamide comprising a crystallizable polyamide homopolymer, a crystallizable polyamide copolymer, a crystallizable polyamide nanocomposite, or a blend thereof; and
(ii) a semi-crystalline second polyamide comprising a polyamide copolymer comprising from about 40% to about 60% by weight of an m-xylylene diamine moiety, from about 5% to about 15% by weight of an isophthalic acid moiety, and from about 30% to about 50% by weight of an aliphatic dicarboxylic acid precursor, and an optional clay; and (b) at least one polymer component blended with said polyamide composition component.

44. The polymeric composition of claim 43 which comprises at least about 50% by weight of said at least one polymer component.

45. The polymeric composition of claim 43 which comprises at least about 80% by weight of said at least one polymer component.

46. The polymeric composition of claim 43 wherein said at least one polymer component comprises polyethylene terephthalate.

47. The polymeric composition of claim 43 wherein said polyamide composition component further comprises:

(iii) at least one polyamide-compatible, oxidizable polydiene; and (iv) at least one oxidation promoting metal salt catalyst.

48. An article comprising the polymeric composition of claim 47.

49. A film comprising the polymeric composition of claim 43.

50. An article comprising the polymeric composition of claim 43.

51. The article of claim 50 which comprises a bottle.

52. A process for forming a polymeric composition comprising combining at least one polymer component with a polyamide composition component, the polyamide composition component comprising:

(i) a first polyamide comprising a crystallizable polyamide homopolymer, a crystallizable polyamide copolymer, a crystallizable polyamide nanocomposite, or a blend thereof; and (ii) a semi-crystalline second polyamide comprising a polyamide copolymer comprising from about 40% to about 60% by weight of an m-xylylene diamine moiety, from about 5% to about 15% by weight of an isophthalic acid moiety, and from about 30% to about 50% by weight of an aliphatic dicarboxylic acid precursor, and an optional clay.

53. The process of claim 52 further comprising forming said polyamide composition into an article.

* * * * *